US012627391B2

(12) United States Patent
Reilly et al.

(10) Patent No.: US 12,627,391 B2
(45) Date of Patent: May 12, 2026

(54) INTEGRATING TERRESTRIAL TIME FEED WITH DATA CENTER DISTRIBUTION NETWORKS FOR CLOCK SYNCHRONIZATION

(71) Applicant: Equinix, Inc., Redwood City, CA (US)

(72) Inventors: Denis Phillip Reilly, Victor, NY (US); Vadim Shmatko, Mountain View, CA (US); Ankur Sharma, Sunnyvale, CA (US); Venkatesan Ramakrishnan, Santa Rosa, CA (US)

(73) Assignee: Equinix, Inc., Redwood City, CA (US)

( * ) Notice: Subject to any disclaimer, the term of this patent is extended or adjusted under 35 U.S.C. 154(b) by 26 days.

(21) Appl. No.: 18/395,383

(22) Filed: Dec. 22, 2023

(65) Prior Publication Data

US 2024/0214101 A1 Jun. 27, 2024

Related U.S. Application Data

(60) Provisional application No. 63/477,172, filed on Dec. 23, 2022.

(51) Int. Cl.
H04J 3/06 (2006.01)

(52) U.S. Cl.
CPC .................................. H04J 3/0685 (2013.01)

(58) Field of Classification Search
CPC ... H04L 5/14; H04J 3/14; H04J 3/0641; H04J 3/0685; H04J 3/0644; H04J 14/02; G06F 1/12; G06F 1/14
See application file for complete search history.

(56) References Cited

U.S. PATENT DOCUMENTS

| | | | | |
|---|---|---|---|---|
| 9,712,229 | B2 * | 7/2017 | McCune | ................. G01S 19/05 |
| 9,886,267 | B2 | 2/2018 | Maheshwari et al. | |
| 9,948,552 | B2 | 4/2018 | Teng et al. | |
| 10,466,363 | B2 * | 11/2019 | Lombardi | ............. G01S 19/235 |
| 10,735,007 | B1 * | 8/2020 | Carlson | ................... H03L 7/093 |
| 11,115,142 | B1 | 9/2021 | Ozarkar et al. | |
| 11,252,065 | B1 | 2/2022 | Kamen et al. | |
| 11,616,587 | B1 * | 3/2023 | Byagowi | ............... H04J 3/0644 |
| | | | | 455/13.2 |
| 2016/0099803 | A1 | 4/2016 | Achanta et al. | |
| 2020/0028585 | A1 * | 1/2020 | Abdullah | .............. H04L 7/0075 |
| 2021/0314889 | A1 * | 10/2021 | Rico Alvarino | .. H04W 56/0005 |
| 2021/0360552 | A1 * | 11/2021 | Annavajjala | ........ G01S 5/02216 |
| 2022/0006547 | A1 | 1/2022 | Hoptroff | |

(Continued)

FOREIGN PATENT DOCUMENTS

| | | |
|---|---|---|
| CN | 110808803 A | 2/2020 |
| CN | 111030066 B | 2/2022 |

OTHER PUBLICATIONS

"Hoptroff," retrieved from https://www.hoptroff.com/product-traceable-time-as-a-service-ttaas, on Dec. 7, 2022, 5 pp.

(Continued)

*Primary Examiner* — Bailor C Hsu
(74) *Attorney, Agent, or Firm* — Shumaker & Sieffert, P.A.

(57) ABSTRACT

In general, the disclosure describes techniques and devices for integrating a terrestrial time feed with one or more computer networks also having a global positioning source (GPS)-based reference time feed to provide improved computing device clock synchronization.

20 Claims, 7 Drawing Sheets

(56)          References Cited

U.S. PATENT DOCUMENTS

| | | | |
|---|---|---|---|
| 2022/0015102 A1* | 1/2022 | Gallagher ......... | H04W 36/0055 |
| 2022/0120915 A1 | 4/2022 | Hoptroff | |
| 2023/0100543 A1* | 3/2023 | Andres Maldonado ..................... | H04J 3/0667 |
| | | | 370/503 |
| 2023/0276401 A1* | 8/2023 | Reddy ................... | H04W 64/00 |
| | | | 455/456.1 |

OTHER PUBLICATIONS

"Introducing Equinix Precision Time," Equinix, Jul. 2023, 2 pp.
"NPLTime Services," retrieved from https://www.npl.co.uk/npltime, on Nov. 27, 2023, 6 pp.
"Time Measurement and Analysis Service (TMAS)," retrieved from https://www.nist.gov/programs-projects/time-measurement-and-analysis-service-tmas, on Dec. 2, 2022, 7 pp.
"Time Over Fiber," retrieved from https://www.nist.gov/image/time-over-fiber, on Dec. 2, 2022, 2 pp.
"Time Traceability for the Finance Sector, Fact Sheet, Version 3.0," National Physical Laboratory, Mar. 2023, 20 pp.
Dennis et al., "Optical Fiber Time Delay Comparison Between NIST and LAMETRO," Journal of Research of the National Institute of Standards and Technology, vol. 126, No. 126040, Jan. 2021, 7 pp.
Elmaghraby et al., "Comparing Frequency Transfer via GNSS and Fiber in a Common-clock Configuration," Abstract, retrieved from https://www.ion.org/ptti/abstracts.cfm?paperID=12976, on Dec. 20, 2023, 2 pp.
Levine, "A Time Service that Provides a Link to UTC(NIST) that is Independent of GNSS Signals," Abstract, retrieved from https://www.ion.org/ptti/abstracts.cfm?paperID=12913, on Nov. 27, 2023, 4 pp.
Sherman et al., "A Resilient Architecture for the Realization and Distribution of Coordinated Universal Time to Critical Infrastructure Systems in the United States," NIST Technical Note 2187, National Institute of Standards and Technology (NIST), Nov. 2021, 189 pp.
International Search Report and Written Opinion of International Application No. PCT/US2023/085857 dated Apr. 10, 2024, 10 pp.
Response to Communication Pursuant to Rules 161(1) and 162 EPC dated Aug. 22, 2025, from counterpart European Application No. 23848443.0, filed Jan. 23, 2026, 70 pp.

* cited by examiner

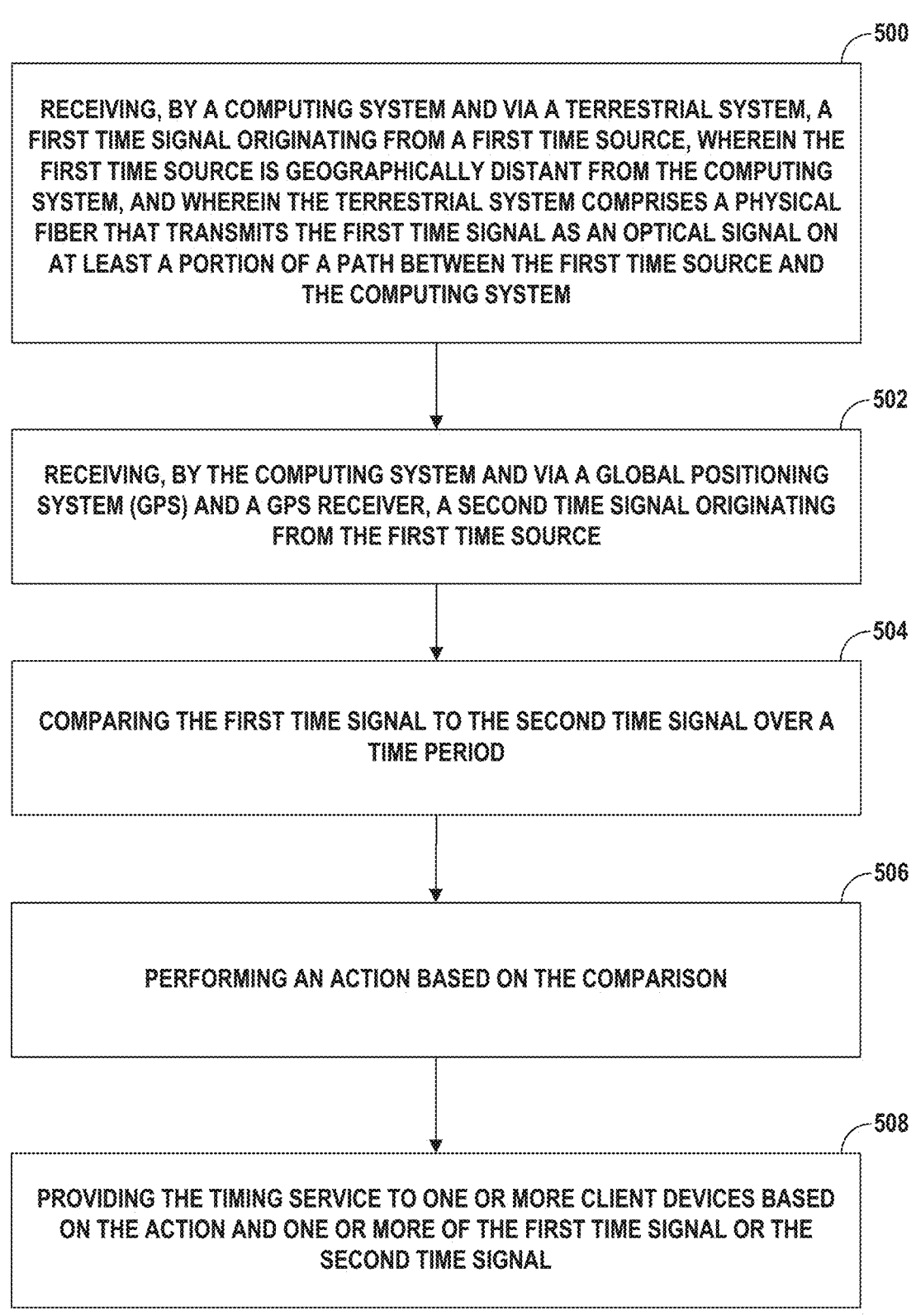

500

RECEIVING, BY A COMPUTING SYSTEM AND VIA A TERRESTRIAL SYSTEM, A FIRST TIME SIGNAL ORIGINATING FROM A FIRST TIME SOURCE, WHEREIN THE FIRST TIME SOURCE IS GEOGRAPHICALLY DISTANT FROM THE COMPUTING SYSTEM, AND WHEREIN THE TERRESTRIAL SYSTEM COMPRISES A PHYSICAL FIBER THAT TRANSMITS THE FIRST TIME SIGNAL AS AN OPTICAL SIGNAL ON AT LEAST A PORTION OF A PATH BETWEEN THE FIRST TIME SOURCE AND THE COMPUTING SYSTEM

502

RECEIVING, BY THE COMPUTING SYSTEM AND VIA A GLOBAL POSITIONING SYSTEM (GPS) AND A GPS RECEIVER, A SECOND TIME SIGNAL ORIGINATING FROM THE FIRST TIME SOURCE

504

COMPARING THE FIRST TIME SIGNAL TO THE SECOND TIME SIGNAL OVER A TIME PERIOD

506

PERFORMING AN ACTION BASED ON THE COMPARISON

508

PROVIDING THE TIMING SERVICE TO ONE OR MORE CLIENT DEVICES BASED ON THE ACTION AND ONE OR MORE OF THE FIRST TIME SIGNAL OR THE SECOND TIME SIGNAL

FIG. 6

INTEGRATING TERRESTRIAL TIME FEED WITH DATA CENTER DISTRIBUTION NETWORKS FOR CLOCK SYNCHRONIZATION

This application claims the benefit of U.S. Provisional Patent No. 63/477,172, filed Dec. 23, 2022, the entire contents of which are incorporated by reference herein.

TECHNICAL FIELD

The disclosure relates to time synchronization in computer networks.

BACKGROUND

Every computing device has some form of clock inside. The crystals used inside these clocks are not expensive devices, but they drift, that is, they lose time due to various causes, such as temperature, humidity and the age of the device. Unless the devices on a network are periodically resynced, eventually, they will all be using a different time.

Enterprise applications usually need to achieve 1 to 10 millisecond synchronization accuracy to avoid problems. Critical infrastructure may require 1-10 microseconds or sub-microsecond or even sub-nanosecond accuracy. To achieve these requirements, there must be a single, reliable source of time to which every device on a network can be synced. This has become especially difficult in hybrid cloud environments, where infrastructure is being deployed in private data centers and at the edge.

A synchronization system, in general, synchronizes clocks of multiple secondary devices (also referred to as "slave" devices, "replica" devices, "follower" devices or "leaf nodes") based on the clock of a chosen master device (also referred to as a "primary" device or a "leader" device). Primary devices are connected to the more precise sources of timestamps than secondary devices.

The master device is a computing device that gets time synchronization data from other master devices or intelligent engines deployed either inside or outside of the synchronization system, such as a global positioning system (GPS). The typical synchronization system has one or more layers of master devices with secondary devices connected to at least one master device.

In some implementations, master devices may belong to a service provider and can be designed to support precise time processing, while secondary devices may belong to the service client and receive timestamp offsets from master devices. These master and secondary devices can be chosen arbitrarily or assigned by the network.

In many applications, including but not limited to financial, scientific, military, programmatic advertising, and gaming industries, time synchronization may be beneficial. For instance, such knowledge would be used to define trade orders in high-frequency trading systems and gamers' response in multi-user games.

SUMMARY

In general, the disclosure describes techniques and devices for integrating a terrestrial time feed with one or more computer networks also having a global positioning source (GPS)-based reference time feed to provide improved computing device clock synchronization. For example, the computer network may be a data center network, and a computing system in a data center network performs the time synchronization processes as described herein. In some examples, the data center network is configured to offer globally available timing services via a cloud fabric to customers across the world.

In some examples, a method comprises receiving, by a computing system and via a terrestrial system, a first time signal originating from a first time source, wherein the first time source is geographically distant from the computing system, and wherein the terrestrial system comprises a physical fiber that transmits the first time signal as an optical signal on at least a portion of a path between the first time source and the computing system: receiving, by the computing system and via a Global Positioning System (GPS) and a GPS receiver, a second time signal originating from the first time source: comparing the first time signal to the second time signal over a time period; performing an action based on the comparison; and providing, by the computing system, a timing service to one or more client devices based on the action and one or more of the first time signal or the second time signal.

In some examples, a time synchronization system comprises a first time source; a Global Positioning System (GPS): a computing system; and a terrestrial system comprising a physical fiber that transmits a first time signal as an optical signal on at least a portion of a path between the first time source and the computing system, wherein the computing system is configured to: receive, via the terrestrial system, the first time signal: receive, via a GPS receiver, a second time signal originating from the first time source: compare the first time signal to the second time signal over a time period: perform an action based on the comparison; and provide a timing service to one or more client devices based on the action and one or more of the first time signal or the second time signal.

In some examples, non-transitory computer-readable media comprises instructions that, when executed by processing circuitry, cause a computing system to: receive, via a terrestrial system, a first time signal originating from a first time source, wherein the first time source is geographically distant from the computing system, and wherein the terrestrial system comprises a physical fiber that transmits the first time signal as an optical signal on at least a portion of a path between the first time source and the computing system: receive, via a Global Positioning System (GPS) and a GPS receiver, a second time signal originating from the first time source: compare the first time signal to the second time signal over a time period: perform an action based on the comparison; and provide a timing service to one or more client devices based on the action and one or more of the first time signal or the second time signal.

The details of one or more examples of the techniques of this disclosure are set forth in the accompanying drawings and the description below. Other features, objects, and advantages of the techniques will be apparent from the description and drawings, and from the claims.

US 12,627,391 B2

3

Figure 3:
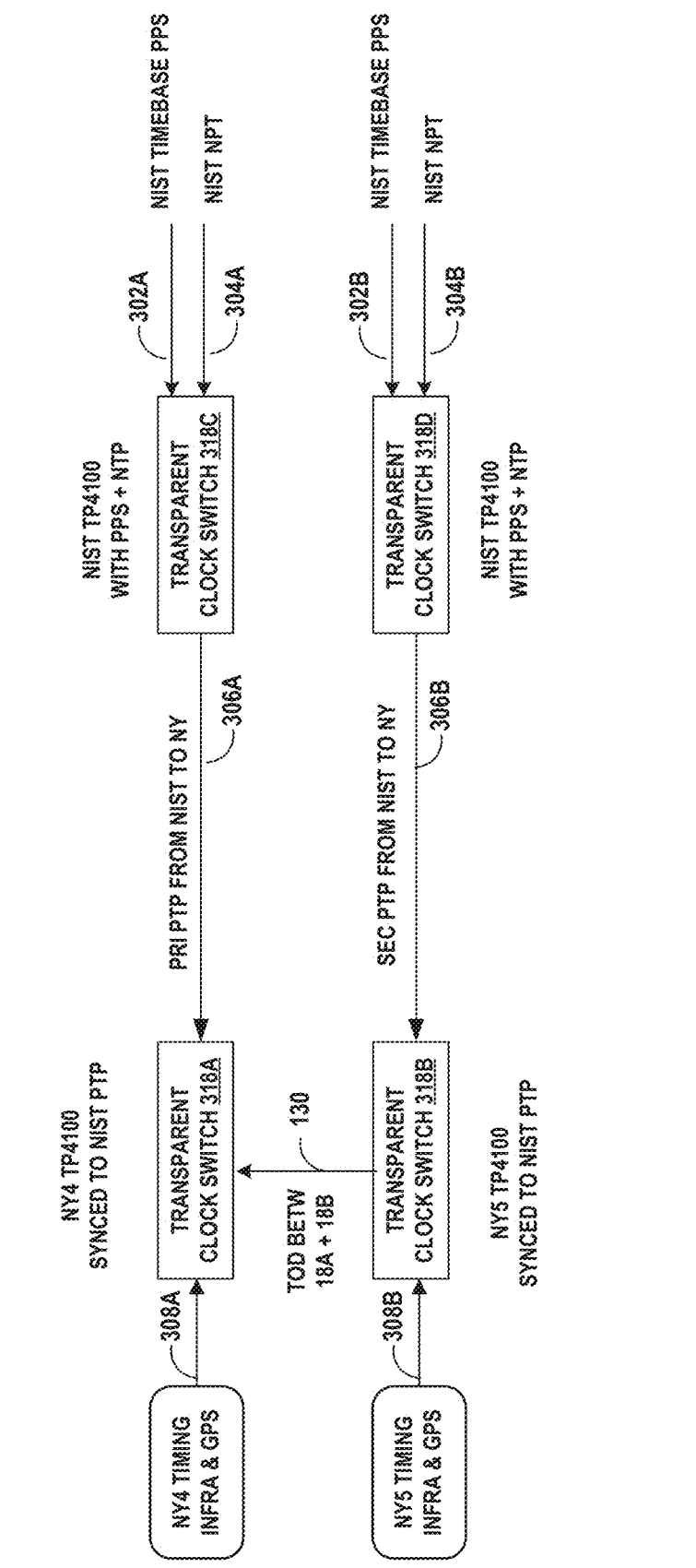

FIG. 3 is a block diagram illustrating devices in a time synchronization system, in accordance with some aspects of the techniques of this disclosure.

Figure 1:
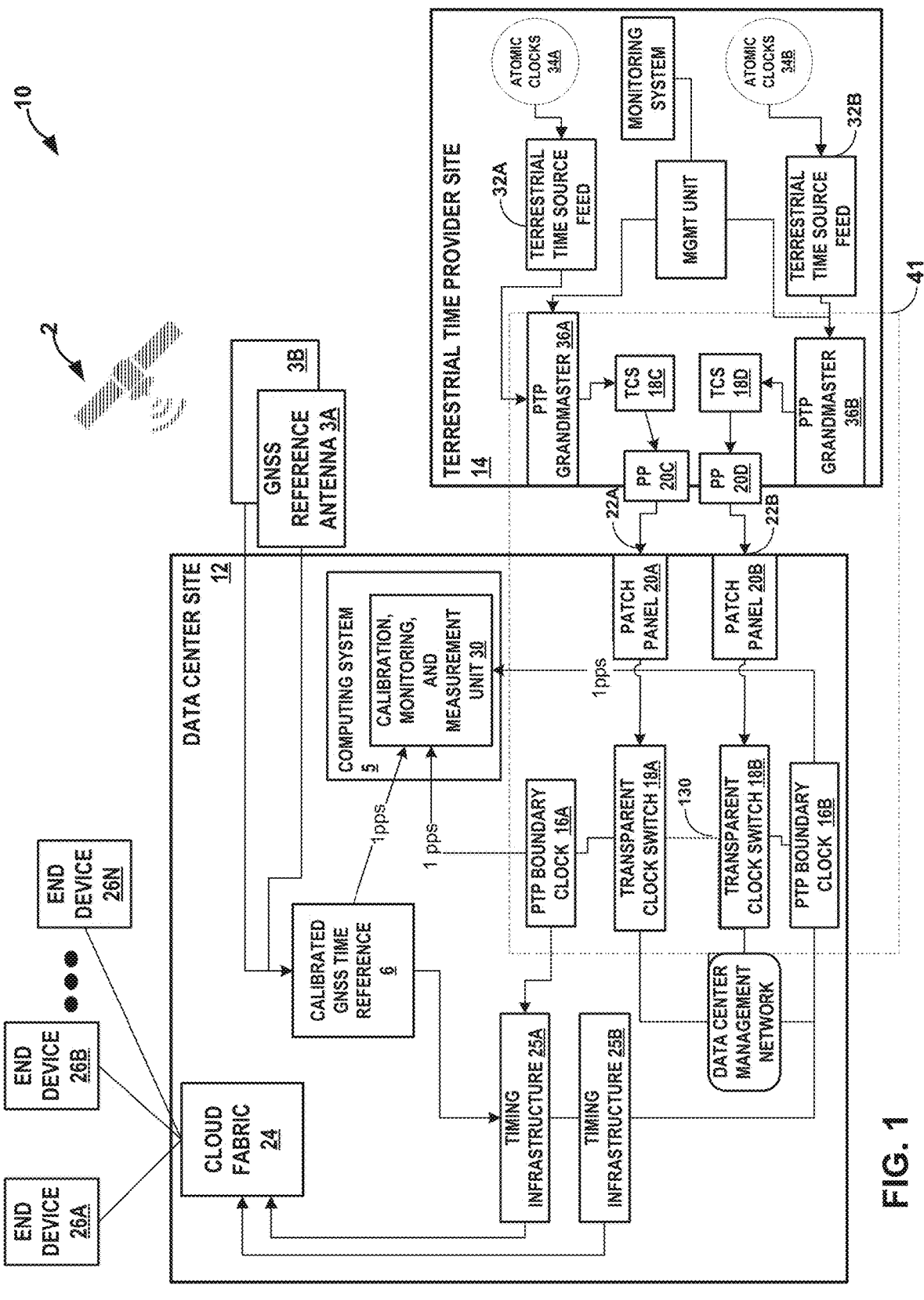
FIG. 1 is a block diagram of an example time synchronization system, in accordance one or more techniques of the current disclosure.
Figure 4:
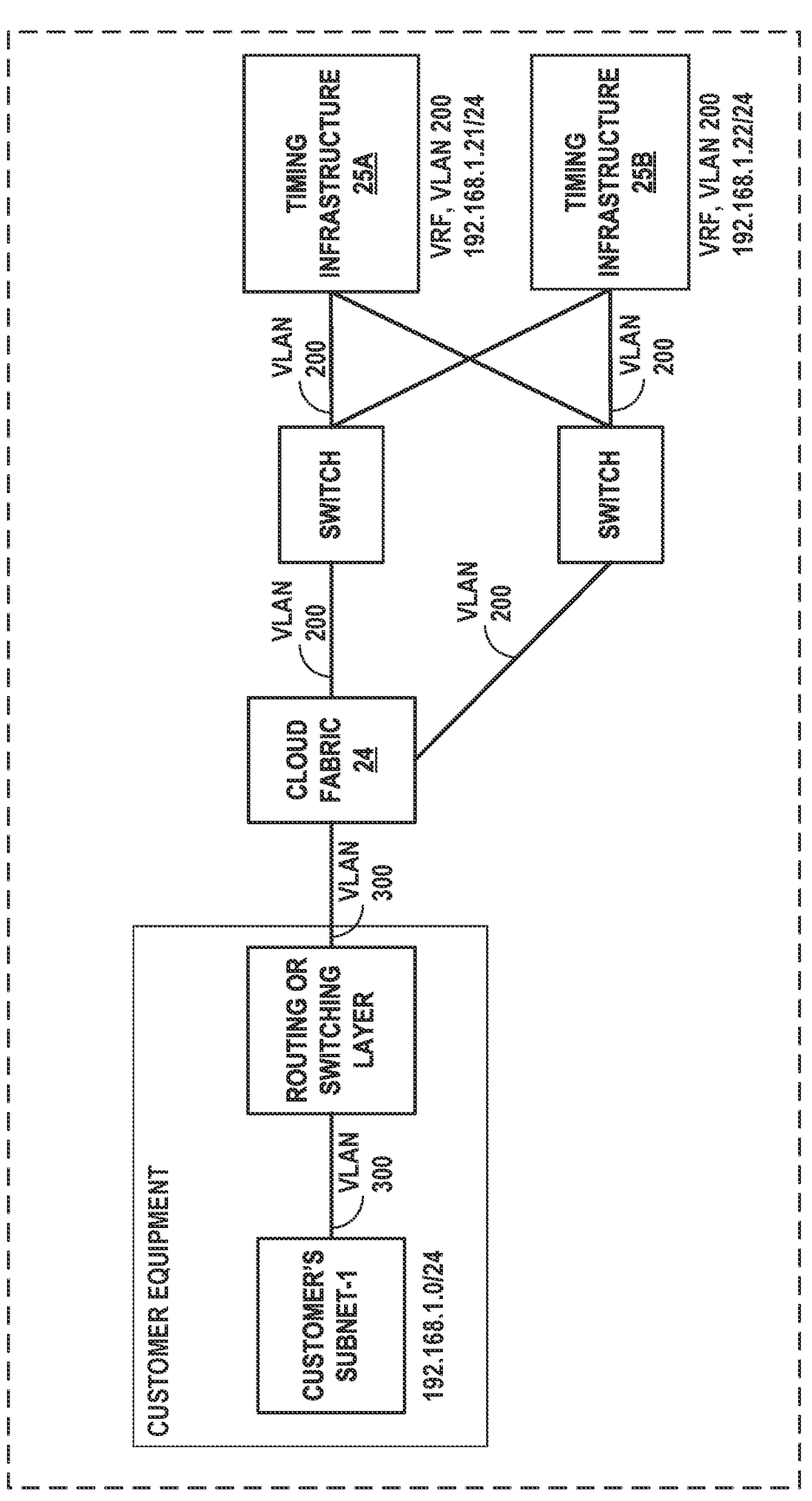

FIG. 4 is a conceptual diagram illustrating an example architecture of a cloud fabric of FIG. 1 and how it may be connected to timing infrastructure in accordance with example aspects of this disclosure.

Figure 5:
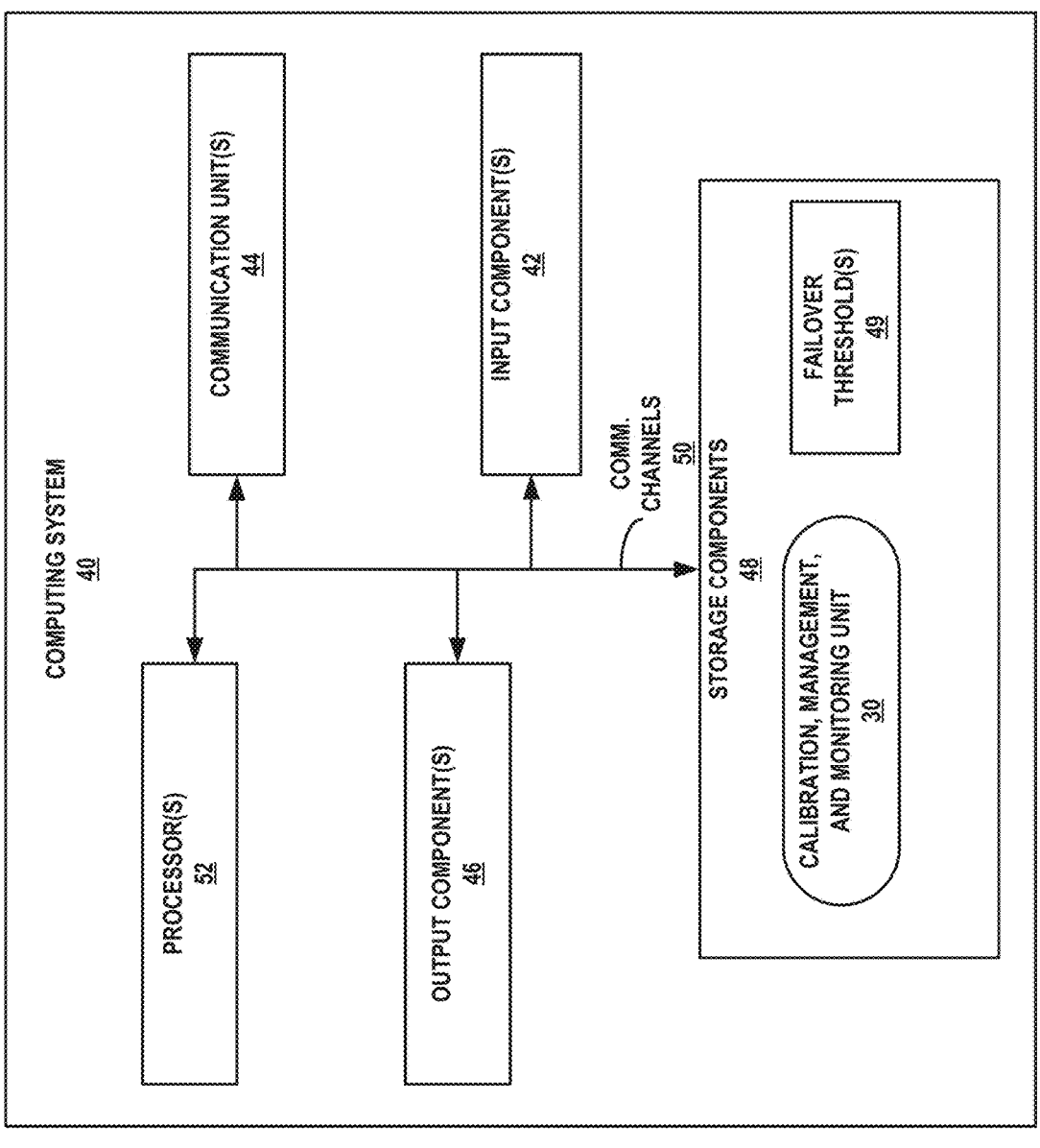

FIG. 5 is a conceptual diagram illustrating an example architecture of a synchronization engine configured to perform one or more techniques in accordance with the current disclosure.

FIG. 6 is a flowchart illustrating example operation of a time synchronization system in accordance with one or more aspects of the techniques of this disclosure.

DETAILED DESCRIPTION

The techniques of this disclosure define a method and device to deliver relatively accurate and precise clock synchronization in a network system. The techniques described herein integrate the synchronization engine into a time synchronization process that may provide stability, versatility, precision, and cost balance.

The timing service is able to deliver a resilient and a secure time synchronization service supporting industry standard protocols such as Precision Time Protocol (PTP) and Network Time Protocol (NTP). Customers use a Precision Time service (also referred to as a timing service) via a cloud fabric software-defined interconnection to directly, securely and dynamically connect distributed enterprise applications running on an interconnection platform.

With Precision Time service, enterprises deployed on the interconnection platform will be able to take advantage of direct, secure and reliable connectivity between source timing servers and distributed systems and devices via the cloud fabric. Leveraging the interconnection platform's low latency and connectivity multiple continents, precision Time will distribute reliable, predictable and secure end-to-end precise timing.

Using Edge Precision Time, for example, systems in New York, Chicago, Dallas and San Francisco could sync time using a master NTP server in New York. The direct and secure interconnection to this service via Cloud Fabric across the interconnection platform removes the need for any synchronization to take place over the public internet, which eliminates issues that could threaten accuracy, coordination, security and reliability.

A lack of synchronization between servers can even impact cybersecurity; with inconsistent log files making it impossible to understand when and how an intrusion took place.

The time synchronization system described herein integrates a time signal received over a physical fiber cable from a standard terrestrial time source provider, and uses the timing signal received from the terrestrial time source to perform an action, such as compare with another time signal received via a satellite source such as GNSS, monitor the quality of the time sources, provide redundancy, and trace back into the primary time reference, for example.

Computing devices in a heterogeneous system are typically equipped with hardware oscillator assisted computer clocks. These computer clocks ("clocks") estimate real-time (which may be represented in equations with the variable 't') with a certain level of accuracy. At any moment of time, the clock timestamp approximation is defined as a function C(t). The value of $C(t_0)$ at any fixed moment in time $t_0$ is called the timestamp. The difference between C(t) and t is called time estimation error Err(C)=t−C(t). Due to temperature changes and resonator aging, all clocks are subject to drifts and jitters. Without special clock time correction procedures, the time estimation error Err(C) will generally increase as time goes on.

One example method of time correction is the use of a device which generates more precise timestamps, and synchronizing the time on other devices to the time on this more precise device. This more precise device is called the "master device." A device that requires timestamp adjustments is called the "secondary device." The synchronization process generally estimates a time difference between the master device and secondary device by analyzing previous measurements as well as the physical state of the devices and the connections between them. The difference between a master device timestamp and a secondary device timestamp is called the timestamp offset. The process of secondary device clock timestamp correction using the timestamp offset is called "clock synchronization" or "timestamp synchronization."

The following is an example of a typical clock synchronization process. At the moment to, a secondary device timestamp estimation $C(t_0)$ has been corrected by timestamp offset $O(t_0)$ as $C_o(t_0)=C(t_0)+O(t_0)$. The clock error in the secondary device starts to grow immediately after the timestamp to until the new correction happens at timestamp t. Err(t, $t_0$) is a function that defines the clock error in the secondary device at time t, which accrues after the last synchronization (in this example, time $t_0$). An approximation of Err(t, $t_0$) may be approximated as follows:

$$Err(t, t_0) = t + R(t - t_0) + D(t - t_0) + s(t), \qquad (1)$$

where t is the current time, $t_0$ is the time at the previous synchronization, R( ) is a frequency offset (clock wander (jitter) due to temperature change), D( ) is the drift due to resonator aging, and s( ) is the stochastic error term.

Systems may accurately estimate R( ) and D( ) in equation (1) as linear or non-linear functions of t and to. In a case of linear function equation (1) can be re-written as:

$$Err(t, t_0) = a(t_0) \times t + b(t_0), \qquad (2)$$

where $t_0$ is the time of the previous synchronization, $a(t_0)$ is a clock drift gradient at the time interval [$t_0$, t], and $b(t_0)$ is an offset at the time interval [$t_0$, t]. If the time interval [$t_0$, t] is small enough, the gradient $a(t_0)$ is very small, and the linear function at the interval [$t_0$, t] can be approximated by the constant function:

$$Err(t, t_0) = b(t_0). \qquad (3)$$

If offset O(t) can accurately estimate the Err(t, $t_0$) function, it would allow the computing system to increase the precision of the secondary device clock. In other words, if $C_o(t)=C(t)+O(t)$, at time t the system would create timestamp $C_o(t)$ for clock error Err(t)=$C_o(t)$−t. The synchronization improves clock precision if $C_o(t)$−t<C(t)−t (i.e. offset decreases the close error). The main problem for time synchronization is the estimation of the offset O(t).

In one example, the clock synchronization process includes the use of GPS modules that provide precise time signals from satellites, distribution modules (switches) that allow the transfer of a time signal from the GPS module to time management modules, cluster node connection and distribution modules, cluster nodes, and a connection intelligent engine that defines the most effective connection mechanism between the GPS module and cluster nodes.

In another example, the clock synchronization apparatus described herein includes GPS modules that provide precise time signals from satellites, distribution modules (switches) that allow the transfer of a time signal from the GPS module to time management modules, cluster node connection and distribution modules, cluster nodes, a connection intelligent engine that defines the most effective connection mechanism between the GPS module and cluster nodes, and an intelligent synchronization filter module that eliminates potential outliers in the time synchronization process.

Certain arrangements of networks include multiple clusters (also referred to herein as "cluster nodes," "device cluster nodes," or "device clusters"), or sets of devices within geographical proximity to one another. Devices from the same cluster node are typically located in a local-area network (LAN) and have faster access times and lower network loads than cross-cluster devices, so clusters typically act separately from one another.

For the purposes of this disclosure, a synchronization system, a computing system, or a system indicates a complex set of devices, algorithms, programs, modules, and components which allow the execution of time synchronization operations. For the purposes of this disclosure, a "device clock" indicates an internal clock of the device. A device can have a single device clock or more than one device clock, including one or more of a Network Interface Card (NIC) card clock, a Graphics Processing Unit (GPU) clock, a central processing unit (CPU) clock, or an operating system clock.

The term "system clock" indicates a clock associated with the synchronization system. The system clock may be a high precision clock which provides a precise time signal and generates precise timestamps, such as a clock on a GPS. The synchronization system may have more than one system clock. The term "timestamp" indicates an individual time signal measurement registered by a time measurement device. For the purposes of this disclosure, a device timestamp indicates a timestamp generated by a device. A system timestamp indicates a timestamp computed by the synchronization system. For the purposes of this disclosure, a timestamp offset (also referred to herein as a "time synchronization offsets" or an "offset") indicates a difference between two timestamps. For instance, the timestamp offset may be calculated as a difference between the device timestamp and the system timestamp.

The network time protocol (NTP) is a networking protocol for clock synchronization between computer systems over packet-switched, variable-latency data networks. The precision time protocol (PTP) is a protocol used to synchronize clocks throughout a computer network. A switch is a computer networking device that connects devices together on a computer network by using packet switching to receive, process, and forward data to the destination device. The term "PTP switch" indicates a switch that supports the PTP standard protocol and allows the receipt, processing, and forwarding of timestamps to the destination devices. An NTP Switch is a switch that supports the NTP standard protocol and allows the receipt, processing, and forwarding of timestamps to the destination devices. A master switch is a special device that allows the receipt, processing, and forwarding of time signal from a GPS antenna.

The term "system state" indicates a set of parameters that allows the estimation of how loaded and "ready for time synchronization" a system is. For the purposes of this disclosure, a master device (also known as a "primary" device or a "leader" device) indicates a special type of device that gets time synchronization data from other master devices or intelligent engines deployed inside the synchronization system, such as a GPS module in communication with a GPS. Master devices are connected to the more precise sources of timestamps than secondary devices. A secondary device (also known as a "slave" device, a "replica" device, a "follower" device, or a "leaf node," all of which may be used interchangeably throughout this disclosure) indicates a device that is typically connected to one or more master devices.

In typical synchronization systems, master devices are subdivided in groups (also referred to as "strata"). Devices that obtain time directly from GPS may belong to the strata 0 group. These stratum 0 devices may be connected to stratum 1 master devices, which can send time accurately over a network. Master devices not connected directly to GPS modules may be referred to as non-GPS master devices. Non-GPS master devices may belong to strata 2 or higher groups. Strata 1 master devices can be connected to strata 2 master devices or directly to the end devices. In general, strata i master devices can be connected to strata i+1 master devices or secondary devices, and devices with higher stratum values are generally less accurate than devices with lower stratum values.

In some implementations, master devices may belong to a service provider and can be designed to support precise time processing, while secondary devices may belong to the service client and receive timestamp offsets from master devices. These master and secondary devices can be chosen arbitrarily or assigned by the network.

For the purposes of this disclosure, a device cluster node (also referred to herein as a "device cluster," a "cluster," or a "cluster node") indicates a set of devices within geolocation proximity. For the purposes of this disclosure, a cross-cluster connection indicates a network connection between different cluster nodes. For the purposes of this disclosure, cross-cluster master devices indicate a special set of master devices that distribute timestamp offsets between device clusters.

An end device may be connected to more than one master device or another end device. End devices may be disconnected from one master device and reconnected to another master device. End devices may be reassigned to be a master device and vice versa. Master devices can be connected to another master device and one or more end devices.

For the purposes of this disclosure, a support vector machine (SVM) indicates a machine learning algorithm that analyzes data for classification and regression analysis. Regression analysis is a set of statistical processes for estimating the relationships among variables. Regression analysis includes many techniques for modeling and analyzing several variables, where the focus is on the relationship between a dependent variable and one or more independent variables. Linear regression is the simplest form of regression analysis and uses one dependent variable and one independent variable.

For the purposes of this disclosure, a time synchronization monitoring system (also referred to as a "time monitoring system" or a "monitoring system") may refer to a complex set of devices, algorithms, programs, modules, and components which enable the surveillance of time synchronization for different devices in heterogeneous network clusters. A monitoring device list may refer to a list of devices added to the time monitoring system.

A time synchronization client device monitoring application (also referred to as a "time synchronization monitoring client" or a "time monitoring client") may refer to a special program that is downloaded and installed by the time monitoring system's user on his device and allows this device to be added to the monitoring device list and the time monitoring service.

A time monitoring authentication module may refer to an intelligent mechanism and apparatus that allows the computing system to check and accept or refuse a specific device ID for the time monitoring service. A probe timestamp may refer to a measure of time at a secondary device or a measure of time at a master device.

One example implementation environment for the techniques described herein is within data centers. Data centers may house multiple different types of devices, each owned by different entities, but each of the devices may be linked inside this overall data center structure. Some devices within the data center may exchange data with other devices in the same data center, but may also exchange data with devices located in data centers in different geographic/metropolitan areas. As such, multiple globally-distributed data centers may each implement the techniques described herein to efficiently and precisely synchronize the clocks on the devices within the same data center, as well as with devices in remote data centers in different geographical areas. In this way, the techniques described herein may be implemented as a downloadable software plugin on customer equipment in a data center that enables a device in the data center to perform the time synchronization processes as described herein. The techniques described herein may balance multiple characteristics, including scalability, versatility, precision, cost, security, and redundancy.

This disclosure describes a service to provide timing data that is transmitted using links based on Dense Wavelength Division Multiplexed (DWDM) circuits. DWDM is an optical fiber multiplexing technology, in which different signals are transported over a single optical fiber using different wavelengths.

FIG. 1 is a block diagram of an example time synchronization system 10, in accordance one or more techniques of the current disclosure.

In some examples, time synchronization system 10 of FIG. 1 may include cloud fabric 24, as described in further detail below. A computing system 5 that includes calibration, monitoring, and measurement unit 30 includes one or more computing devices that may, in some examples, determine whether to perform the time synchronization process based on GNSS time reference or based on a terrestrial time feed time reference. Data provided by computing system 5 may then be used by timing infrastructure 25A-25B, such as for sending timestamp offsets to end devices 26 via cloud fabric 24. Although depicted as a separate block in the example of FIG. 1, in some examples the functionality of computing system 5, including calibration, monitoring, and measurement unit 30, may be distributed across some or all of PTP boundary clocks 16A, 16B, and/or timing infrastructure 25A, 25B.

In some examples, computing system 5 may execute a synchronization engine with multiple processors or multiple devices. One or more such processors or devices may be located within a public, private, or hybrid cloud. A computing device of the computing system may execute components of the synchronization engine as a virtual machine executing on underlying hardware. One or more of such components may execute as one or more services of an operating system or computing platform. One or more of such components may execute as one or more executable programs at an application layer of a computing platform. In other examples, functionality provided by a module could be implemented by a dedicated hardware device.

In some examples, time synchronization system 10 may include a set of geographically distributed network connected devices. Devices may be separated into clusters called device clusters or cluster nodes, e.g., based on geographical locations and other technical characteristics. Each device in synchronization system 1 may belong to a particular device cluster. Each cluster node may include devices that belong to the service provider and devices that belong to the service users.

In some cases, the use of publicly available clock synchronization solutions requires configuration, tune ups and maintenance of the dedicated timing servers. These servers can utilize different timing protocols (PTP/NTP) and operating systems (Windows/Linux). Operators may need to manually monitor the status of their clocks and server's synchronization status. Timestamps are provided but required clock synchronization configurations and maintenance is expensive and time consuming. Unfortunately, public GPS solutions provide relatively low accuracy due to the delivery of timestamps over the public internet for timestamp delivery and create a significant risk of hacker attacks.

In some instances, prior to computing system 5 performing a time synchronization process in accordance with the techniques described herein, computing system 5 may be configured to receive signals from GPS satellite 2 via redundant GPS antennas 3A and 3B, to calibrated GNSS time reference(s) 6, which convert the received signals into data indicative of a timestamp, and transmits a timestamp to grand master devices (not shown) of timing infrastructure 25A, 25B. A grand master device may receive the timestamp and synchronize an internal clock on the grand master device to the timestamp received from computing system 5.

As defined above, leaf nodes may be secondary master devices or end devices. Computing system 5 may be configured to perform a time synchronization process with any devices of leaf nodes, either individually or in combination. As such, computing system 5 may be configured to perform the time synchronization process described herein directly with one or more devices in time synchronization system 10. In some examples, a grand master device may be one of a set of redundant master devices of time synchronization system 10, and the set of redundant master devices may include one or more backup grand master devices (not shown).

In some examples, time synchronization system 10 uses a distributed infrastructure software solution that provides next generation technology, platform, and services that enable precise, accurate, secure, and scalable clock synchronization in distributed enterprise applications deployed in a heterogeneous system environment.

In some examples, cloud fabric 24 provides a monitoring service that allows web-based monitoring of device clock synchronization. The monitoring service may enable device name and IP-based sorting and searching, multi-resolution detailed and aggregated synchronization offset charting, license control, historical data and advanced analytics.

In some examples, cloud fabric 24 provides a synchronization service allows precise and accurate synchronization of time with the distributed set of devices connected to high-precision GPS antennas. The synchronization service may support both the NTP and PTP standards. The synchronization service is deployed on highly available infrastructure, and provides security via integration with a cloud fabric 24 security system. In these and other examples, computing system 5, monitoring service, and/or synchronization service may be part of a programmable network platform of a cloud exchange, e.g., cloud fabric 24. One example of a time synchronization service in a cloud exchange system is provided by U.S. application Ser. No. 16/438,310, filed Jun. 11, 2019, the entire contents of which are incorporated by reference herein.

Cloud fabric 24 may provide a precise timing platform that enables to create unique user keys for security, authentication, and management of the service, simple service subscription, client installation, adding and removing client devices, UI-based device clock synchronization monitoring such as search by device names and IPs, historical and analytic data, precise and accurate clock synchronization with NTP and PTP on Linux and Windows. The precise timing platform may also provide scalability: customers can add additional client devices anywhere where the cloud fabric 24 infrastructure is set and available for customers. The precise timing platform may also provide statistics on clock drift and access to the service historic data.

The precise timing platform may also provide highly-available, fault tolerant, horizontally scalable monitoring and synchronizes device clocks with accuracy and precision. The results of synchronization are stored in a distributed redundant database. These proprietary technologies are used to optimize device authentication. They allow for parametric tune up and the ranking of devices and connections.

In some examples, the precise timing platform provides a clock synchronization and monitoring solution targeting edge computing applications and built based on colocation infrastructure that support high performance, network reliability, redundancy, and low latency.

In the example of FIG. 1, system 1 includes a cloud fabric 24, which may connect multiple autonomous systems (not shown), one or more of timing infrastructure 25, and end devices 26, in accordance with example aspects of the techniques of this disclosure. In some examples, cloud fabric 24 may be a Multiprotocol Label Switching (MPLS) network.

In general, an interconnection platform provides customers of the exchange, e.g., enterprises, network carriers, and SaaS customers, with secure, private, virtual connections to multiple cloud service providers (CSPs) globally. The multiple CSPs participate in the cloud exchange by virtue of their having at least one accessible port in the cloud exchange by which a customer can connect to the one or more cloud services offered by the CSPs, respectively. A cloud exchange allows private networks of any customer to be directly cross-connected to any other customer at a common point, thereby allowing direct exchange of network traffic between the networks of the customers. Customers may include network carriers (or network service providers), enterprises, and other users of cloud services offered by one or more cloud service providers.

A cloud-based services exchange, or "cloud exchange" may be configured and managed to facilitate virtual connections for cloud services delivery from multiple cloud service providers to one or more cloud customers. The cloud exchange may enable cloud customers to bypass the public Internet to directly connect to cloud services providers to improve performance, reduce costs, increase the security and privacy of the connections, and leverage cloud computing for additional applications. In this way, enterprises, network carriers, and SaaS customers, for instance, can integrate cloud services with their internal applications as if such services are part of or otherwise directly coupled to their own data center network. Examples of cloud-based services exchanges are described in U.S. Pat. No. 9,948,552, issued Apr. 17, 2018, and entitled "CLOUD-BASED SERVICES EXCHANGE;" and in U.S. Pat. No. 9,886,267, issued Feb. 6, 2018, and entitled "INTERCONNECTION PLATFORM FOR REAL-TIME CONFIGURATION AND MANAGEMENT OF A CLOUD-BASED SERVICES EXCHANGE;" the entire contents of each of which being incorporated by reference herein.

In some examples, cloud fabric 24 may be part of, e.g., an IP network of, a cloud-based services exchange that includes interconnection assets configured to connect a customer of the cloud-based services exchange to one or more cloud service providers (CSPs), the plurality of interconnection assets including a virtual circuit by which the customer (e.g., an enterprise customer) accesses a cloud service from a CSP. Cloud fabric 24 may also include an orchestration engine (not shown) configured to modify the interconnection assets.

In some examples, an interconnection platform for cloud fabric 24 exposes a collection of software interfaces, e.g., application programming interfaces (APIs), that allow access to capabilities and assets of the interconnection platform in a programmable fashion. As such, the software interfaces provide an extensible framework that allows software developers associated with customers and partners of the exchange to build software applications that access the interconnection platform that automatically manage interconnection with multiple cloud service providers participating in the interconnection platform. In other words, developers from network services providers, cloud service providers, managed service providers and other enterprises may use the software interfaces exposed by the interconnection platform and defined by the APIs to build custom applications and frameworks for seamless interaction with the interconnection platform to facilitate the delivery of cloud services from cloud service providers to cloud service customers. These software interfaces defined by the APIs enable machine-to-machine communication for near real-time setup and modifications of interconnections, and may also eliminate or reduce the need for human interaction for the entire interconnection setup and management process. In this way, the software interfaces provide an automated and seamless way to establish, un-install, and manage interconnection with multiple cloud providers participating in an interconnection platform.

In some examples, several master devices may be connected to one another via cloud fabric 24. In some examples, cloud fabric 24 connects grand master device to master devices. Leaf-to-leaf connections may likewise be made via cloud fabric 24. For example, in the example of FIG. 1, end device 26A may connect to end device 26B via cloud fabric 24. Cloud fabric 24 can connect a customer's leaf node device to one or more master devices, including grand master devices. Connecting master devices and leaf nodes via cloud fabric 24 (e.g., by virtual circuits) may improve precision of time synchronization, including PTP-based time synchronization. Cloud fabric 24 may improve resilience and reliability of the system. In other examples, rather than being connected to one another by virtual circuits via cloud fabric 24, any of end device 26 and master devices may be interconnected by direct wire connections (e.g., cross-connects), metro-connection, fiber connect, or connected via the Internet. In some examples, these different types of connection options may be selectively configurable by a time synchronization system for synchronizing clocks on one or more devices in a network such as time synchronization system 10.

Definitions

GPS Antenna—A GPS reference antenna is a device that receives the distinct radio-frequency signals sent by GPS satellites, such as GPS satellite 2. The antennas convert the GPS signals into electronic signals that they then broadcast to GPS receivers. An example of a GPS antenna in FIG. 1 is GNSS reference antenna 3A and 3B, and an example of a GPS receiver is GNSS time reference 6. Although shown with only a single receiver of GNSS time reference 6, in some examples each of GNS reference antennas 3A, 3B may broadcast to its own separate GNSS time reference receiver.

GPS Network Time Server—GPS network time servers are computer devices that receive highly-accurate time from the GPS system, and broadcasts that time to the clocks of the devices deployed on the network (including routers, switches and other servers). Typically, time servers support either NTP or PTP for clock synchronization. In FIG. 1, GPS network time servers are part of timing infrastructure 25A, 25B.

Grandmaster Clock—Grandmaster clocks receive Universal Time Coordinated (UTC)-based time information from an external time reference, most commonly a GNSS satellite source (for example, GPS). This time is then distributed downstream to the clocks of client devices. When successfully receiving a reference signal, the grandmaster derives accurate time from the reference. Timing infrastructure 25A, 25B also includes one or more grandmaster clocks.

Boundary Clock—A boundary block (BC) is a clock node that has two or more ports. For example, a router or Ethernet switch might be capable of operating as a BC. A BC generally has one port in the role of a secondary clock, and the remaining ports take the role of the master clock. An example of boundary clocks in FIG. 1 is PTP boundary clock 16A, PTP boundary clock 16B.

The Precision Time service described herein sources precise time from the Global Navigation Satellite System (GNSS), including Global Positioning System (GPS) using GNSS receivers. Precision Time infrastructure uses redundant GNSS receivers capable of receiving GPS signal accurately to deliver precise time. In addition, the GNSS receivers are equipped with Rubidium atomic clocks to holdover timing accuracy if for any reason connectivity to the GPS signal is lost.

The GNSS receiver and antennas used in the Precision Time infrastructure have the capability to receive signals from multiple GNSS constellations, including, for example, GPS L1, GLONASS L1, BeiDou B1, Galileo E1, and QZSS L1. Together, these time sources provide multiple levels of redundancy.

The GNSS-enabled grandmaster clocks use Rubidium oscillators that provide accuracy up to the sub-microsecond when locked with the GNSS (GPS) source. Even with a loss of connectivity to the source, the service can maintain up to sub-microsecond level of accuracy.

Unfortunately, GNSS services are susceptible to interference from jamming, which occurs when a signal is broadcast on the same frequency as GNSS signals, therefore drowning them out, and spoofing, when a "fake" signal is broadcast directly to a target antenna, making it converge on an incorrect solution. To protect against these types of interference, in some examples firewall software is integrated into the GNSS receivers to act a firewall. GNSS signals are analyzed, and when interference is detected, the GNSS link is disabled.

GNSS time sources are prone to jamming and spoofing events and are not fully reliable even if all right security measures are in place. Some solutions recommend using redundant GNSS references which are geo-distribution and will help avoid failure situations due to geo-redundancy design. However, there can be situations where the entire GNSS signals can become weak and time synchronization will be impacted.

Jamming refers to interference with signals at GNSS frequencies and can be caused either unintentionally or intentionally. Unintentional reasons can include space weather or faulty equipment that can inadvertently jam GNSS signal reception. Intentional jamming is designed to overpower a weak GNSS signal. Although it is illegal to jam GPS signals, individuals can use portable jammers available for purchase online.

Spoofing occurs when GPS simulators or custom-built systems are used to hack into a GPS system. The hacking causes the receiver to catch on to a new falsely generated signal, causing the GPS to provide incorrect information to the user. The hacked GPS system then tricks the GPS receiver into thinking it is at a different time and location, thereby falsifying the location and time and ultimately disrupting the operation.

Businesses that rely on GNSS infrastructure for accurate location and time synchronization include financial institutions, critical infrastructure, government agencies, transportation, broadcast and telecommunication companies. When a network infrastructure using a GNSS receiver gets jammed, it will start to lose the time synchronization and ultimately impact the operation of the network. In the case of a communication network, it can impact the quality of the voice call or a video streaming service delivery. For a financial institution, the jamming can result in non-compliance-resulting in big fines and loss of credibility.

Spoofing involves a more malicious plan. Individuals who spoof often do so to cause harm, for personal, political, or financial gain, or because they are engaged in illegal activities-such as changing the timestamps for financial transactions. Financial and stock market transactions are marked with UTC time, which uses GNSS systems.

In accordance with aspects of the techniques of this disclosure, in some examples, a Precision Time system uses redundant and strategically located GPS antennas, receivers, grandmaster clocks, and the high-performance network backbone of Cloud Fabric to deliver secure, reliable, and precise time synchronization. The Precision Time service infrastructure has integrated hardware and software technology capable of constantly monitoring the live sky signal from the GNSS to detect against the threat of jamming and spoofing issues. When a threat is detected the live-sky signal is disabled—thereby eliminating the threat—and an alarm is generated. Simultaneously, a terrestrial time source is delivered by the timing infrastructure in place of the GNSS time to provide a precise time from the same ultimate UTC time source, while the issue with the GNSS is addressed. In some examples, the GNSS time and the terrestrial time may not originate from the same ultimate UTC time source.

A customer using colocation services in a data center may experience jamming on their own antenna and GPS-based time server and could not reliably synchronize their infrastructure as they did not have the necessary technology and capabilities to address the situation. The customer can avail themselves of the time service provided by the data center that avoids such situations.

Although jamming and spoofing have existed for years, businesses can now reduce these risks and protect themselves against the vulnerabilities. Companies can achieve higher levels of resiliency and security and have peace of mind by using a service equipped with GNSS risk mitigation capabilities.

Precision Time service includes globally distributed time services in a network of a data center that can be provided to users around the world with low latency. Precision Time supports two time protocols to synchronize clocks on a network: Network Time Protocol (NTP), and Precision Time Protocol (PTP). While the time accuracy of PTP is better than that of NTP, NTP has the ability to synchronize more devices on the network with low network overhead. A network can be configured with either protocol (NTP or PTP). No matter which protocol is used, time is sourced from the Precision Time time source and sent over the network so all connected devices can synchronize to the precise time.

Precision Time supports these NTP standards: NTPv3 (RFC 1305), NTPv4 (RFC 5905). NTP is a light-weight, standard networking protocol used for clock synchronization. NTP is intended to synchronize all participating computers in a network to within a few milliseconds of UTC. NTP servers typically synchronize devices in a network using either GNSS or other time servers that can trace their time to a true time source via peer networking.

NTP is usually described as a client-server system, but it can as easily be used in peer-to-peer relationships, where both peers consider the other to be a potential true time source. While NTP is easy to configure, it can be less secure than PTP when used over the public internet.

Precision Time supports the 1588-2008 IEEE standard. Titled "Precision Clock Synchronization Protocol for Networked Measurement and Control," the 1588-2008 IEEE standard is more commonly called Precision Time Protocol v2, or simply PTP.

A PTP server (also known as a grandmaster clock) synchronizes time throughout a computer network with a clock accuracy in the sub-microsecond range. To achieve time accuracy, PTP requires all devices being synchronized have a network interface controller (NIC) that supports hardware timestamping. This NIC requirement rolls down to all intermediate network infrastructure, including the routers and switches deployed in the network. PTP is a solution for systems that require highly accurate time, such as measurement and control systems. The protocol is currently used to synchronize financial transactions, mobile phone tower transmissions, and sub-sea acoustic arrays.

The timing infrastructure in data center site 12 may, in some examples, provide a timing service using the GNS time as a primary source to distribute time over cloud fabric 24 or data center networks for consumption by end users. Some implementations may consider the GNS signal to be the primary time source, but data center site 12 also has a time terrestrial time source integration.

The two atomic clocks 34A, 34B are the two "golden time" signals. From these time sources, that time is fed into the two PTP Grandmasters 36A, 36B (collectively, PTP grandmasters 36), then to corresponding transparent clock switches (TCS), such as a primary PTP transparent clock switch and a secondary PTP transparent clock switch, e.g., TCS 18C and TCS 18D.

Figure 2A:
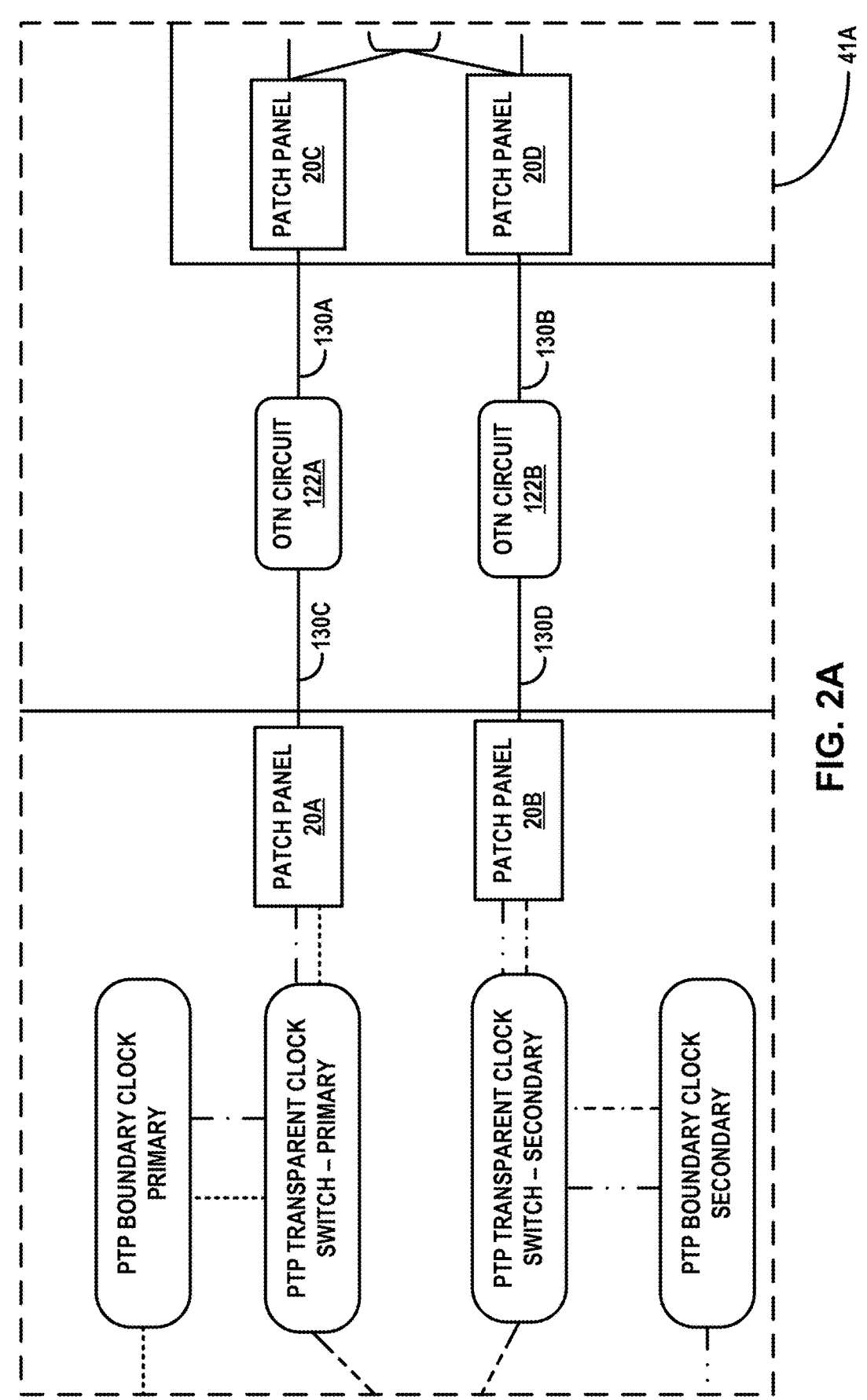
FIG. 2A is a block diagram illustrating an example of a portion of the system of FIG. 1 in further detail, in accordance with one or more techniques of the current disclosure.
Figure 2B:
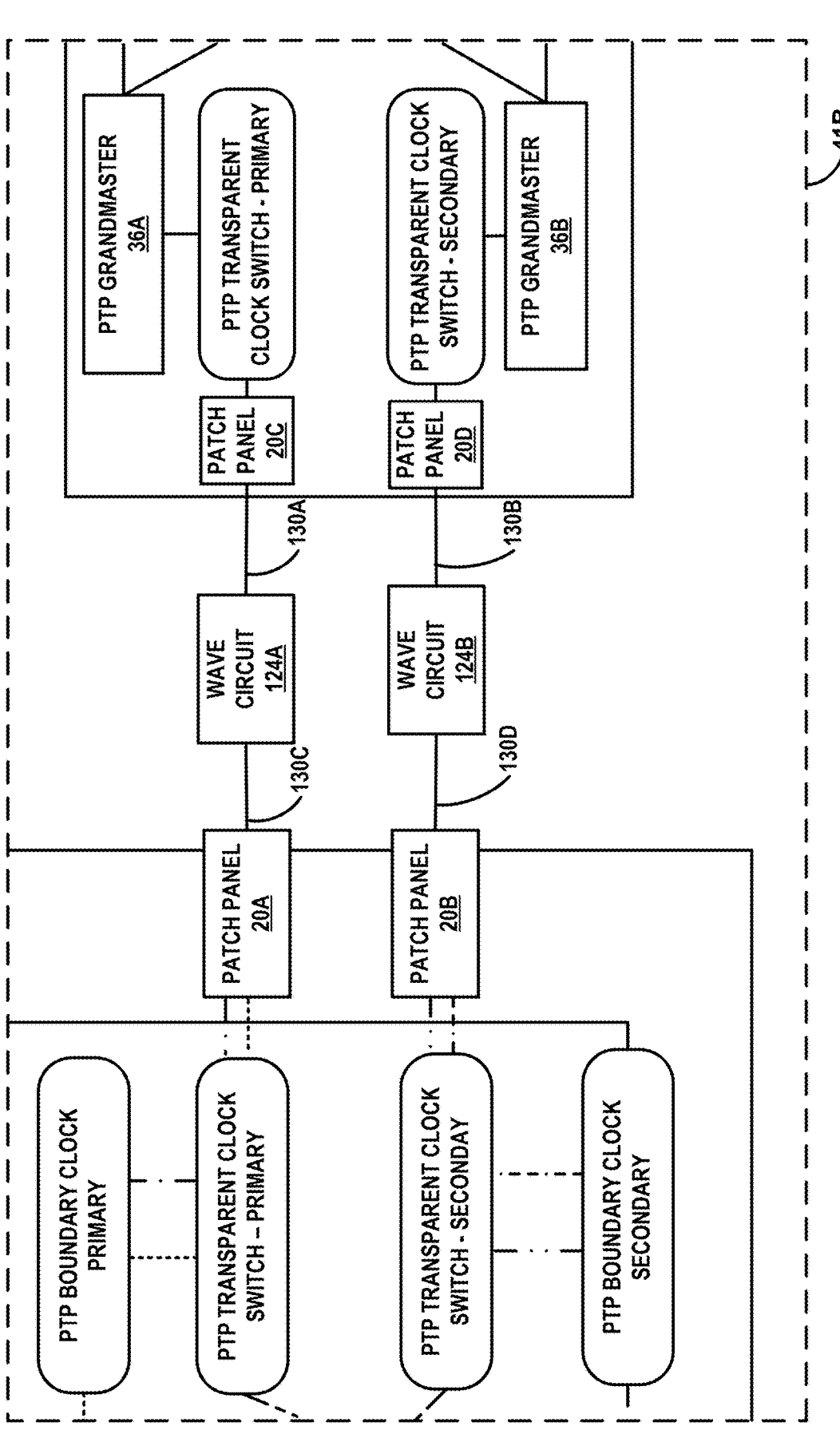
FIG. 2B is a block diagram illustrating an example of a portion of the system of FIG. 1 in further detail, in accordance with one or more techniques of the current disclosure.

Terrestrial connections 22A, 22B may be, for example, a physical connection such as a long-haul circuit, a dark fiber, a wave circuit, or an Optical Transport Network (OTN), as described in further detail in FIGS. 2A-2B, which extend to the Data Center site 12. The time signals from each of TCS 18C and TCS 18D are connected to the corresponding connection 22A, 22B via a patch panel ("PP") 20C, 20D.

In some examples, such as shown in FIG. 1, two redundant connections 22, e.g., wave circuits, are used to provide redundancy through the whole chain. In other examples, a system may include multiple (including more than 2) redundant wave circuits, but have only one grandmaster 36 sending time through both links. In other examples, only a single connection 22 may be used, though this is not recommended for redundancy purposes.

It may be desirable from a redundancy standpoint to have two golden time sources and two grandmasters as shown in FIG. 1. If any one element in that system goes down, the second corresponding element provides redundancy. Similarly, although not shown in FIG. 1, there may be two PTP primary feeds coming through the GNSS reference time. Patch panels 20A, 20B are used on the data center side to connect the terrestrial time feeds received via connection 22A, 22B to data center site 12.

The clocks from PTP Grandmasters 36A, 36B are used to generate the PTP signals which goes across connections 22 to the data center site 12, and which are fed into a PTP boundary clock (16A and 16B, collectively 16). The PTP boundary clock could be the same type of device as the PTP grandmasters 36 which is run as a grandmaster role on the other side. On the receiving end the device is used as a boundary clock. Now use the redundant time sources as two different outdoor signals coming from the terrestrial source of time to come to these boundary clocks via transparent clock switches 18A, 18B, that convert the PTP signal coming from the terrestrial side, into PTP multicast PTP profile time feed into the timing infrastructure 25A, 25B.

The system receives one pps signal from each of the PTP boundary clocks 16, and sends it into the calibration monitoring and measurement unit 30 of computing system 5. Pulse per second (PPS) is a type of time synchronization in which a signal outputs a high logic level once per second. The calibration monitoring and measurement unit 30 is a device that calibrates and traces the time with the primary source of reference, which is the Golden Time source. Here, calibration monitoring and measurement unit 30 helps to calibrate the time, so that it is traceable to the ultimate source of time of the atomic clocks 34. If anything happens with GNSS reference time received from GPS 2, e.g., in case of jamming, the system still has these two time signals, also feeding PTP Time into the timing infrastructure. In case of complete outages on the GNS side, computing system 5 can still use the terrestrial time source as a backup, while at the same time it is using the terrestrial source of time to do the traceability and calibration.

In some examples, the GNSS time and the terrestrial time are both provided to the timing service primarily for redundancy purposes, and it is expected that the time that obtained from each side is going to be similar. That is, one or the other of the time signals is used by the timing service as a primary time source, but if, upon comparing the two time signals, the computing system 5 determines the time received from both time sources is not similar to some preconfigured threshold (e.g., fifty picoseconds), the system can output an alert to system operators as an indication to determine what the problem is with the GNSS time or the terrestrial time. Particularly when two or more redundant GNSS signals are received and two or more redundant terrestrial time sources are received, the comparison of all of the time signals may give insight into whether a discrepancy is caused by a problem on the GNSS side or the terrestrial side.

In other examples, the GNSS time and the terrestrial time may both be used to generate a blended time that is provided by the timing service, such as by calculating an average time offset based on both the GNSS time and the terrestrial time, rather than simply for redundancy.

In some examples, the GNSS-based timebase is used as a primary time source, which is monitored using the time signal(s) received via the terrestrial link(s). In some examples, a separate calibration, monitoring, and measurement unit 30 may be connected for only some initial measurements for calibration. In other examples, the coaxial IPPS signal from the Timing Infrastructure 25A, 25B is fed directly into the PTP Boundary Clocks 16A, 16B, and PTP Boundary Clocks 16A, 16B perform the comparison directly in those devices.

In some examples, the GNSS-based time reference for uses of two GNSS antennas on the roofs of physically separate buildings. Each antenna has separate hardware attached to generate separate PPS signals (both derived from GPS/GNSS), and then two separately-derived PPS signals are brought into each of the two PTP Boundary clocks 16A, 16B. In some examples, the two PTP boundary clocks 16A and 16B are connected to each other by a cross-connect 130, which enables signals to be exchanged (e.g., a time-of-day (TOD) protocol signal) for comparison of first information obtained by PTP boundary clock 16A in comparing a primary GNSS signal from timing infrastructure 25A to the primary terrestrial signal received from connection 22A, with second information obtained by PTP boundary clock 16B in comparing a secondary GNS signal from timing infrastructure 25B to the secondary terrestrial signal received from connection 22B.

In some examples, the GNSS-based time reference [for] uses two GNSS antennas on the roofs of physically separate buildings. Each antenna has separate hardware attached to generate separate PPS signals (both derived from GPS/GNSS), and then two separately-derived PPS signals are brought into each of the two PTP Boundary clocks 16A, 16B. In some examples, the two PTP boundary clocks 16A and 16B are connected to each other by a cross-connect 130, which enables signals to be exchanged (e.g., a time-of-day (TOD) protocol signal) for comparison of first information obtained by PTP boundary clock 16A in comparing a primary GNSS signal from timing infrastructure 25A to the primary terrestrial signal received from connection 22A, with second information obtained by PTP boundary clock 16B in comparing a secondary GNS signal from timing infrastructure 25B to the secondary terrestrial signal received from connection 22B.

In this manner, the Cloud Fabric 24 can offer traceable, calibrated and backup source of time feed to customers that are collocated, and/or have virtual presence across Hybrid Clouds and integrated with Data center networks. The techniques of this disclosure enable data centers to integrate with terrestrial sources of time provided by trusted institutions like National Institute of Standards and Technology (NIST), NPL, etc. This integration model is useful for providing traceability, backup and calibration to the primary sources of time to end-users who use data center environments to run their critical applications.

The system of FIG. 1 reflects a generic design that can be used in any data center distributed environment and feed traceable time remotely and reliably over private and secure data center networks. In this manner, the timing system relies not only on GNSS-based time, but also has a backup source of time, and such as a terrestrial source of time. It is not simple to get a time feed from terrestrial source of time from NIST, NPL, etc., as these are all government bodies and to integrate with them is possible only over connections such as OTN circuits, dark fiber networks, or wave circuits.

System 10 provides a traceable, reliable and calibrated time services model integrated into one or more data center networks. This provides a service globally which is backed up with traceable sources of time along with GNSS time sources. This provides a multi-source common-view disciplined clock system.

Examples of a time distribution system based on a multi-source common-view disciplined clock are described in section II.C. of J. Sherman et al., "A Resilient Architecture for the Realization and Distribution of Coordinated Universal Time to Critical Infrastructure Systems in the United States: Methodologies and Recommendations from the National Institute of Standards and Technology (NIST), NIST Technical Note 2187 November 2021, available at https://doi.org/10.6028/NIST.TN.2187, the entire content of which is incorporated by reference herein. Before a clock can be synchronized to agree with another clock, the time difference between the clocks must be measured and known. The common-view technique requires the timing service and a receiver connected to the reference clock to each receive, nearly simultaneously, a signal from the same transmitter. This can be used to replicate the performance of a reference clock at a remote location. As described in the examples herein, one source signal is received via GNSS, and a second source signal is received via a terrestrial feed. The difference between the two "indirect" comparisons effectively substitutes for a direct comparison and reveals the time difference between the PTP boundary clock time from the terrestrial time provider site 14 and the GNSS reference time from the GNSS reference antenna.

Although described for purposes of example in terms of PTP, TOD, and PPS signals, in other examples the time signals described throughout this disclosure may be NTP signals, or another time synchronization protocol.

FIG. 2A is a block diagram illustrating an example of a portion 41A of system 10 of FIG. 1 in further detail, in accordance with one or more techniques of the current disclosure. As shown in FIG. 2A, the PTP Grandmasters 36A, 36B may be connected via corresponding Optical Transport Network (OTN) circuits 122A, 122B to patch panels 20A, 20B, respectively, of the data center site 12 of FIG. 1. In other examples, rather than an OTN, a PTP grandmaster may be connected to a patch panel via dark fiber, or other connection means. A virtual circuit may run over the OTN circuit. In some examples, virtual routers (not shown) may be intermediate to the PTP grandmasters and the patch panels, such as when the data center site and the terrestrial time site are located in different metro areas.

FIG. 2B is a block diagram illustrating another example of a portion 41B of system 10 of FIG. 1 in further detail, in accordance with one or more techniques of the current disclosure. As shown in FIG. 2B, the PTP Grandmasters 36A, 36B may be connected via corresponding wave circuits 124A, 124B to patch panels 20A, 20B, respectively, of the data center site 12 of FIG. 1.

OTN circuits as shown in FIG. 2A may frequently reroute on the service provider's long haul network due to congestion. Every time a line reroutes, its delay profile changes, and that has an effect on the time recovered at the other end. It is not the delay itself that matters, but the asymmetry between the delays in both directions. The time synchronization system can tolerate very long delays, but need the difference between the "upstream" delay and "downstream" delay to be constant. Instead, FIG. 2B employs fixed DWDM links for the terrestrial time signal connections. One draw back to this approach is that if there is a fiber cut on one of the DWDM lines, that entire line would go down, whereas with an OTN link, the link has the capability of being rerouted. However, this application can tolerate short-term outages, and it is better that the delay of the connection be as consistent as possible and have a line go down for a day than have it use a different route with a different delay profile.

FIG. 3 is a block diagram illustrating an example arrangement of devices, according to a particular physical setup, in accordance with some aspects of the techniques of this disclosure. The operation is described with respect to computing system 5 of FIG. 1 but may be performed by any computing system or systems described in this disclosure.

At a NIST location, a primary transparent clock switch 318C receives a first NIST timebase PPS signal 302A, and a second NIST NPT signal 304A. Transparent clock switch 318A converts these signals to a time signal such as primary PTP signal, which is sent from a NIST location to a geographically distant data center "NY4" located in New York, via physical fiber 306A as an optical signal on at least a portion of a path between the first NIST time source and the first computing system 5 at NY4. The primary terrestrial PTP signal is received from physical fiber 306A (e.g., connected by a patch panel), at transparent clock switch 318A in NY4. Transparent clock switch 318A also receives a GNSS-based time signal 308A from NY4 timing infrastructure and GPS receiver. Transparent clock switch 318A may compare the time signal received from the GNSS-based time signal 308A based on the terrestrial time signal received from physical fiber 306A.

At a NIST location that may be the same or different location as the primary, a secondary transparent clock switch 318D receives a second NIST timebase PPS signal 302B, and a second NIST NPT signal 304B. Secondary transparent clock switch 318B converts these signals to a second time signal such as a secondary PTP signal, which is sent from the NIST location to a geographically distant data center "NY5" located in New York, via physical fiber 306B as an optical signal on at least a portion of a path between the second NIST time source and the second computing system 5 at NY5.

The secondary PTP signal is received from physical fiber 306B (e.g., connected by a patch panel), at transparent clock switch 318B. Transparent clock switch 318A also receives a GNSS-based time signal 308B from NY5 timing infrastructure and GPS receiver. Transparent clock switch 318B may compare the time signal received from the GNSS-based time signal 308B based on the terrestrial time signal received from physical fiber 306B. The two transparent clock switches 318A and 318B may exchange their synchronized times (based on their individual comparisons), by one or more sending time signals via TOD on a cross-connect 138 coupling them.

Computing system 5 can perform one or more actions based on these comparisons, as described herein. Each of transparent clock switches 318A-318D may be, for example, a device such as a TimeProvider® 4100 series device. The links that include physical fiber 306 are independent of signals from GNSS satellites and other broadcast signals.

Another example configuration consists of a first redundant pair of wave circuits between the NIST time scale in Boulder, Colorado and San Jose, California, and a second redundant pair of wave circuits between the NIST clock ensemble in Gaithersburg, Maryland and the financial center in the New York/New Jersey area. The characteristics of the wave circuits are monitored and validated by comparing the data received at the remote ends with data received from the GPS system. This configuration is useful for testing and validating the circuits. The transmission format for the wave circuits is based on the usual two-way method, in which the one-way delay is estimated as one-half of the measured round-trip value. The magnitude of the delay is not important. The inbound and outbound delays are not equal in general, and this results in an offset in the time data received at the remote end. This time offset is stable and a correction will be applied to the data to compensate for it. The magnitude of the correction varies from one circuit to another, and is typically on the order of a microsecond. The correction may be validated by periodic calibrations that will use a portable clock or a portable calibrated GNSS receiver.

Initial tests show that the short-term stability of the circuits is about 20 ns RMS (root mean square of the time offset). The stability is limited by the short-term fluctuations in the circuit delay. Occasional changes to the asymmetry result in a corresponding step in the data received at the remote end. These steps, which are very rapid, are estimated and removed by comparing the received time data with the short-term stability of the clock at the remote end, and the accuracy with which a step can be detected and removed depends on this short-term stability. For example, the short-term fractional-frequency stability of a rubidium atomic clock is of order 10-12, so that correcting the data for a time step will be determined primarily by statistical characteristics of the short-term stability of the circuit delay (about 20 ns RMS at an averaging time of a few seconds). The time dispersion due to the fluctuations in the frequency of the clock at the remote site will be negligible relative to this value.

In some examples, the physical fiber may be a wave circuit, such as a wavelength-division multiplexing (WDM), dense wavelength-division multiplexing (DWDM), or coarse wavelength-divisional multiplexing (CWDM) based wave circuit that transmits the first time signal as the optical signal. In other examples, the physical fiber comprises an Optical Transport Network (OTN) circuit.

FIG. 4 is a conceptual diagram illustrating an example architecture of a cloud fabric 24 of FIG. 1 and how it may be connected to timing infrastructure 25A and 25B, and to customer equipment such as end devices 22 of FIG. 1, in accordance with one or more techniques of the current disclosure. FIG. 3 illustrates only one particular example of cloud fabric 24, and many other examples of cloud fabric 24 may be used in other instances and may include a subset of the components included in FIG. 3 or may include additional components not shown in FIG. 3. In some examples, cloud fabric 24 and timing infrastructure 25A, 25B may include features as described in U.S. Pat. No. 11,252,065, entitled CLOCK SYNCHRONIZATION IN A HETEROGENEOUS SYSTEM, issued Feb. 15, 2022, the entire contents of which are incorporated by reference herein.

FIG. 5 is a block diagram of a computing system 40 that may be configured to perform one or more techniques in accordance with the current disclosure. Computing system 40 of FIG. 5 is described below as having an example of calibration monitoring and measurement unit 30 of FIG. 1. FIG. 5 illustrates only one example, and many other examples may be used in other instances and may include a subset of the components included in example computing system 40 or may include additional components not shown in example computing system 40 of FIG. 5.

As shown in the example of FIG. 5, computing system 40 includes one or more processors 52, one or more input components 42, one or more communication units 44, one or more output components 46, and one or more storage components 48. Storage components 48 of computing system 40 include a calibration measurement and monitoring unit. Communication channels 50 may interconnect each of the components 42, 44, 46, 48, 52, and 54 for inter-component communications (physically, communicatively, and/or operatively). In some examples, communication channels 50 may include a system bus, a network connection, an inter-process communication data structure, or any other method for communicating data.

One or more communication units 44 of computing system 40 may communicate with external devices, such as end devices of FIG. 1, via one or more wired and/or wireless networks by transmitting and/or receiving network signals on the one or more networks. Examples of communication units 44 include a network interface card (e.g., such as an Ethernet card), an optical transceiver, a radio frequency transceiver, a GPS receiver, or any other type of device that can send and/or receive information. Other examples of communication units 44 may include short wave radios, cellular data radios, wireless network radios, as well as universal serial bus (USB) controllers.

One or more input components 42 of computing system 40 may receive input. Examples of input are tactile, audio, and video input. Input components 42 of computing system 40, in one example, includes a presence-sensitive input device (e.g., a touch sensitive screen, a PSD), a mouse, a keyboard, a voice responsive system, a video camera, a microphone or any other type of device for detecting input from a human or machine. In some examples, input components 42 may include one or more sensor components, one or more location sensors (e.g., GPS components, Wi-Fi components, cellular components), one or more temperature sensors, one or more movement sensors (e.g., accelerometers, gyros), one or more pressure sensors (e.g., barometers), one or more ambient light sensors, and one or more other sensors (e.g., microphones, cameras, infrared proximity sensors, hygrometers, and the like).

One or more output components 46 of computing system 40 may generate output. Examples of output include tactile, audio, and video output. Output components 46 of computing system 40, in one example, includes a PSD, a sound card, a video graphics adapter card, a speaker, a cathode ray tube (CRT) monitor, a liquid crystal display (LCD), or any other type of device for generating output to a human or machine.

One or more processors 52 may implement functionality and/or execute instructions associated with computing system 40. Examples of processors 52 include application processors, display controllers, auxiliary processors, one or more sensor hubs, and any other hardware configure to function as a processor, a processing unit, or a processing device. Calibration monitoring and measurement unit 30 may be operable by processors 52 to perform various actions, operations, or functions of computing system 40. For example, processors 52 of computing system 40 may retrieve and execute instructions stored by storage components 48 that cause processors 52 to perform the operations of calibration monitoring and measurement unit 30. The instructions, when executed by processors 52, may cause computing system 40 to store information within storage components 48, such as failover thresholds 49 that define a value at which calibration monitoring and measurement unit 30 will fail over from providing timing service based on the GNSS reference signal to providing timing service based on the terrestrial time signal.

One or more storage components 48 within computing system 40 may store information for processing during operation of computing system 40 (e.g., computing system 40 may store data accessed by synchronization engine 54 and/or report engine 56 during execution at computing system 40). In some examples, storage component 48 is a temporary memory, meaning that a primary purpose of storage component 48 is not long-term storage. Storage components 48 on computing system 40 may be configured for short-term storage of information as volatile memory and therefore not retain stored contents if powered off. Examples of volatile memories include random-access memories (RAM), dynamic random-access memories (DRAM), static random-access memories (SRAM), and other forms of volatile memories known in the art.

Storage components 48, in some examples, also include one or more computer-readable storage media. Storage components 48 in some examples include one or more non-transitory computer-readable storage media. Storage components 48 may be configured to store larger amounts of information than typically stored by volatile memory. Storage components 48 may further be configured for long-term storage of information as non-volatile memory space and retain information after power on/off cycles. Examples of non-volatile memories include magnetic hard discs, optical discs, floppy discs, flash memories, forms of electrically programmable memories (EPROM), or electrically erasable and programmable (EEPROM) memories. Storage components 48 may store program instructions and/or information (e.g., data) associated with synchronization engine 54 and/or report engine 56. Storage components 48 may include a memory configured to store data or other information associated with synchronization engine 54 and/or report engine 56.

Calibration monitoring and measurement unit 30 may receive, from a global positioning system, signals indicating a time, and may determine an offset and convert the received signals into a timestamp that accounts for the offset, and sends a data packet including the timestamp. Using this timestamp, calibration monitoring and measurement unit 30 may synchronize the clock on a master device with the timestamp. Calibration monitoring and measurement unit 30 can monitor and calibrate the value of the offset determined for which ever time source is being used as the primary time, by calibration monitoring and measurement unit 30 comparing time signals received from the GNSS time sources and the terrestrial time sources. In some examples, calibration monitoring and measurement unit 30 updates the offset value based on the comparing. In some examples, calibration monitoring and measurement unit 30 may determine to switch over to using a different time source based on the comparing.

FIG. 6 is a flowchart illustrating example operation of a time synchronization system in accordance with one or more aspects of the techniques of this disclosure. The operation is described with respect to computing system 5 of FIG. 1 but may be performed by any computing system or systems described in this disclosure.

In the time synchronization system 10, computing system 5 receives, via terrestrial system that includes terrestrial connection 22A, a first time signal originating from a first time source, such as atomic clocks 34A (500). The first time source is geographically distant from computing system 5.

"Geographically distant" can refer to more than 10 miles, more than 100 miles, or more than 1000 miles. The terrestrial connection 22A of the terrestrial system comprises a physical fiber that transmits the first time signal as an optical signal on at least a portion of a path between the first time source and computing system 5. Computing system 5 receives, via GPS system and GPS receiver, a second time signal originating from the first time source (502). A comparison is performed to compare the first time signal to the second time signal over a time period (504), and an action is performed based on the comparison (506). The action may include switching to use the first time signal as a primary time source, switching to use the second time signal as a primary time source, or other action. Computing system 5 provides the timing service to one or more client devices based on the action and one or more of the first time signal or the second time signal (508).

In some examples, the physical fiber is a first physical fiber, the GPS system is a first GPS system, the GPS receiver comprises a first GPS receiver, and the comparison comprises a first comparison, and the computing system receives, by the computing system and via the terrestrial system, a third time signal originating from a second time source, wherein the second time source is geographically distant from the computing system, and wherein the terrestrial system comprises a second physical fiber that transmits the third time signal as an optical signal on at least a portion of a path between the second time source and the computing system. The computing system further receives, via a second GPS system and a second GPS receiver, a fourth time signal originating from the second time source; and compares the third time signal to the fourth time signal over a time period as a second comparison. In this example, performing an action includes performing, based on the first comparison and the second comparison, the action.

Where comparing the first time signal to the second time signal yields first difference information, and comparing the third time signal to the fourth time signal yields second difference information, the method may also include comparing the first difference information to the second difference information to obtain a delta, and performing the action comprises performing the action based at least in part on the delta.

In one example, when the timing service uses the first time signal as a primary time source, computing system 5 performs an action by switching to use the second time signal as the primary time source based on determining the first time signal is unreliable. For example, the computing system 5 may change a priority value of the first time signal to be lower than a priority value of the second time signal, such as by changing a priority field in PTP protocol communication. For example, the IEEE 1588-2008 standard features two 8-bit priority fields in PTP. The reverse may also be performed, from the second time signal as primary to the first, in a similar manner.

In one example, performing an action based on the comparison includes: when the timing service uses the first time signal as a primary time source, switching, by the computing system, to use the second time signal as the primary time source based on determining the first time signal is unreliable. In one example, performing an action based on the comparison includes: when the timing service uses the second time signal as a primary time source, switching, by the computing system, to use the first time signal as the primary time source based on determining the second time signal is unreliable. In one example, performing an action based on the comparison of the first time signal to the second time signal includes: when the timing service uses the first time signal as the primary time source, outputting, by the computing system for display, an indication of a quality of the first time signal based on the comparison.

In one example, performing an action based on the comparison of the first time signal to the second time signal includes: when the timing service uses the second time signal as the primary time source, outputting, for display, an indication of a quality of the second time signal based on the comparison. In one example, performing an action based on the comparison of the first time signal to the second time signal includes: outputting an alert notification indicating a difference between the first time signal and the second time signal has crossed a predefined threshold.

Depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), graphics processing units (GPUs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated.

What is claimed is:

1. A method comprising:
receiving, by a computing system and via a terrestrial system, a first time signal originating from a first time source of a terrestrial time provider site, wherein the first time source is geographically distant from the computing system, and wherein the terrestrial system comprises a physical fiber that transmits the first time signal as an optical signal directly between a first patch panel local to the first time source and a second patch panel of a data center site hosting the computing system;
receiving, by the computing system and via a Global Positioning System (GPS) and a GPS receiver of the data center site, a second time signal originating from the first time source;
comparing, by the computing system, a time obtained from the first time signal to a time obtained from the second time signal over a time period;
performing, by the computing system and based on the comparison, an action related to one or more of the first time signal or the second time signal; and
providing, by the computing system and via a software-defined interconnection configured in a cloud fabric of the data center site, a timing service to one or more client devices based on the action and one or more of the first time signal or the second time signal.

2. The method of claim 1, wherein the physical fiber comprises a wave circuit, the wave circuit comprising a wavelength-division multiplexing (WDM), dense wavelength-division multiplexing (DWDM), or coarse wavelength-divisional multiplexing (CWDM) based wave circuit that transmits the first time signal as the optical signal.

3. The method of claim 1, wherein the physical fiber comprises an Optical Transport Network (OTN) circuit.

4. The method of claim 1, wherein performing an action based on the comparison comprises:

when the timing service uses the first time signal as a primary time source, switching, by the computing system, to use the second time signal as the primary time source based on determining the first time signal is unreliable.

5. The method of claim 1, wherein performing an action based on the comparison comprises:
when the timing service uses the second time signal as a primary time source, switching, by the computing system, to use the first time signal as the primary time source based on determining the second time signal is unreliable.

6. The method of claim 1, wherein performing an action based on the comparison comprises:
when the timing service uses the first time signal as a primary time source, outputting, by the computing system for display, an indication of a quality of the first time signal based on the comparison.

7. The method of claim 1, wherein performing an action based on the comparison comprises:
when the timing service uses the second time signal as a primary time source, outputting, for display, an indication of a quality of the second time signal based on the comparison.

8. The method of claim 1, wherein performing an action based on the comparison comprises outputting an alert notification indicating a difference between the first time signal and the second time signal has crossed a predefined threshold.

9. The method of claim 1, wherein the physical fiber comprises a first physical fiber, wherein the GPS system comprises a first GPS system, wherein the GPS receiver comprises a first GPS receiver, and wherein the comparison comprises a first comparison, the method further comprising:
receiving, by the computing system and via the terrestrial system, a third time signal originating from a second time source, wherein the second time source is geographically distant from the computing system, and wherein the terrestrial system comprises a second physical fiber that transmits the third time signal as an optical signal directly between a third patch panel local to the second time source and a fourth patch panel local to the computing system;
receiving, by the computing system and via a second GPS system and a second GPS receiver, a fourth time signal originating from the second time source; and
comparing, by the computing system, a time obtained from the third time signal to a time obtained from the fourth time signal over a time period as a second comparison,
wherein performing an action comprises performing, based on the first comparison and the second comparison, the action.

10. The method of claim 9,
wherein comparing the first time signal to the second time signal yields first difference information, and
wherein comparing the third time signal to the fourth time signal yields second difference information, the method further comprising:
comparing the first difference information to the second difference information to obtain a delta, and
wherein performing the action comprises performing the action based at least in part on the delta.

11. A time synchronization system comprising:
a first time source of a terrestrial time provider site;
a Global Positioning System (GPS);

a computing system hosted by a data center site; and a terrestrial system of the terrestrial time provider site, comprising a physical fiber that transmits a first time signal as an optical signal directly between a first patch panel local to the first time source and a second patch panel of the data center site hosting the computing system, wherein the computing system is configured to:

receive, via the terrestrial system, the first time signal;

receive, via a GPS receiver of the data center site, a second time signal originating from the first time source;

compare a time obtained from the first time signal to a time obtained from the second time signal over a time period;

perform an action related to one or more of the first time signal or the second time signal; and provide a timing service via a software-defined interconnection configured in a cloud fabric of the data center site to one or more client devices based on the action and one or more of the first time signal or the second time signal.

12. The time synchronization system of claim 11, wherein the physical fiber comprises a wave circuit, the wave circuit comprising a wavelength-division multiplexing (WDM), dense wavelength-division multiplexing (DWDM), or coarse wavelength-divisional multiplexing (CWDM) based wave circuit that transmits the first time signal as the optical signal.

13. The time synchronization system of claim 11, wherein to perform an action based on the comparison, the computing system is configured to:

when the timing service uses the first time signal as a primary time source, switch to use the second time signal as the primary time source based on determining the first time signal is unreliable.

14. The time synchronization system of claim 11, wherein to perform an action based on the comparison, the computing system is configured to:

when the timing service uses the second time signal as a primary time source, switch to use the first time signal as the primary time source based on determining the second time signal is unreliable.

15. The time synchronization system of claim 11, wherein to perform an action based on the comparison, the computing system is configured to:

when the timing service uses the first time signal as a primary time source, output, for display, an indication of a quality of the first time signal based on the comparison.

16. The time synchronization system of claim 11, wherein to perform an action based on the comparison, the computing system is configured to:

when the timing service uses the second time signal as a primary time source, output, for display, an indication of a quality of the second time signal based on the comparison.

17. The time synchronization system of claim 11, wherein to perform an action based on the comparison, the computing system is configured to:

output an alert notification indicating a difference between the first time signal and the second time signal has crossed a predefined threshold.

18. The time synchronization system of claim 11, wherein the physical fiber comprises a first physical fiber, wherein the GPS system comprises a first GPS system, wherein the GPS receiver comprises a first GPS receiver, and wherein the comparison comprises a first comparison, the time synchronization system further comprising:

a second physical fiber that transmits a third time signal as an optical signal directly between a third patch panel local to the second time source and a fourth patch panel local to the computing system, wherein the computing system is configured to:

receive, via the terrestrial system, the third time signal;

receive, via a second GPS receiver, a fourth time signal originating from the second time source; and compare a time obtained from the third time signal to a time obtained from the fourth time signal over a time period as a second comparison, wherein to perform an action the computing system is configured to perform, based on the first comparison and the second comparison, the action.

19. The time synchronization system of claim 18, wherein comparing the first time signal to the second time signal yields first difference information, and wherein comparing the third time signal to the fourth time signal yields second difference information, wherein the computing system is further configured to:

compare the first difference information to the second difference information to obtain a delta, and wherein to perform the action the computing system is configured to perform the action based at least in part on the delta.

20. Non-transitory computer-readable media comprising instructions that, when executed by processing circuitry, cause a computing system to:

receive, via a terrestrial system, a first time signal originating from a first time source of a terrestrial time provider site, wherein the first time source is geographically distant from the computing system, and wherein the terrestrial system comprises a physical fiber that transmits the first time signal as an optical signal directly between a first patch panel local to a second time source and a second patch panel of a data center site hosting the computing system;

receive, via a Global Positioning System (GPS) and a GPS receiver of the data center site, a second time signal originating from the first time source;

compare a time obtained from the first time signal to a time obtained from the second time signal over a time period;

perform, based on the comparison, an action related to one or more of the first time signal or the second time signal; and provide, via a software-defined interconnection configured in a cloud fabric of the data center site, a timing service to one or more client devices based on the action and one or more of the first time signal or the second time signal.

* * * * *